US005945642A

United States Patent [19]
Nayar et al.

[11] Patent Number: 5,945,642
[45] Date of Patent: Aug. 31, 1999

[54] ACOUSTIC HORN

[75] Inventors: Satinder K. Nayar; Haregoppa S. Gopalkrishna; Joseph M. D'Sa, all of Woodbury, Minn.

[73] Assignee: Minnesota Mining and Manufacturing Company, St. Paul, Minn.

[21] Appl. No.: 09/042,239

[22] Filed: Mar. 13, 1998

[51] Int. Cl.[6] .......... B32B 31/00; G10K 11/00
[52] U.S. Cl. .......... 181/184; 156/580.2
[58] Field of Search .......... 310/321, 323, 310/325, 328; 156/580.1, 580.2; 181/182, 184

[56] References Cited

U.S. PATENT DOCUMENTS

| | | | |
|---|---|---|---|
| 4,131,505 | 12/1978 | Davis, Jr. | 156/580.1 |
| 4,315,181 | 2/1982 | Holze, Jr. | 310/323 |
| 4,321,500 | 3/1982 | Paros et al. | 310/323 |
| 4,710,668 | 12/1987 | Fima et al. | 310/323 |
| 5,014,556 | 5/1991 | Dunegan . | |
| 5,410,204 | 4/1995 | Imabayashi et al. | 310/323 |
| 5,763,981 | 6/1998 | Okazaki et al. | 310/323 |

FOREIGN PATENT DOCUMENTS

| | | |
|---|---|---|
| 2547225 | 12/1984 | France . |
| 2167270 | 5/1986 | United Kingdom . |
| WO92/12807 | 8/1992 | WIPO . |

*Primary Examiner*—Khanh Dang
*Attorney, Agent, or Firm*—Charles D. Levine

[57] ABSTRACT

An acoustic horn imparts energy at a selected wavelength, frequency, and amplitude. The horn has at least one nodal plane and a natural frequency of vibration. The horn has an outer surface and at least one cutout located in the outer surface. The cutout is located at a longitudinal location on the surface that does not contact the nodal plane. The horn length is a function of the shape, size, number, and location of the cutouts, and is less than the length of a solid horn having the same natural frequency of vibration. The horn can vibrate at a natural frequency and the length of the horn can be less than one-half wavelength of vibration.

9 Claims, 3 Drawing Sheets

ACOUSTIC HORN

TECHNICAL FIELD

The present invention relates to acoustic horns. More particularly, the present invention relates to acoustic horns with slots or orifices.

BACKGROUND OF THE INVENTION

A horn is an acoustical tool made of, for example, aluminum, titanium, or sintered steel that transfers the mechanical vibratory energy to the part. Horn displacement or amplitude is the peak-to-peak movement of the horn face. The ratio of horn output amplitude to the horn input amplitude is the gain. Gain is a function of the mass or volume ratio between the input and output sections of the horn. Generally, in horns, the direction of amplitude at the output surface of the horn is coincident with the direction of the applied mechanical vibrations at the input end.

An acoustic horn imparts energy at a selected wavelength, frequency, and amplitude. Typically, the acoustic horn imparts energy at ultrasonic levels and is called an ultrasonic horn. Generally the ultrasonic horns are made to have a natural frequency around 20 kHz. The length of the horn is equal to an integer multiple of one-half wavelength of the material used. Each horn has a nodal plane for every integer multiple of one-half wavelength. (A nodal plane, or nodal line, is the point on the horn with zero amplitude of vibration.) For materials such as aluminum, titanium, and steel the half wavelength ($\lambda/2$), at 20 kHz is approximately equal to 12.7 cm (5 in). Therefore the horn lengths are normally 12.7, 25.4, or 38.1 cm (5, 10 or 15 in). The relationship between the natural frequency (f) of the horn, the horn length (L), and the material properties of the horn such as modulus (E) and the density ($\rho$) is established by simplifying the horn into a spring mass system.

Although a horn appears to be a simple machined part, to operate properly it must be designed to resonate within a predetermined frequency range. If unwanted resonances exist, the horn will vibrate simultaneously in more than one direction with destructive results. Failure to meet all of these requirements can result in fracturing the horn, damaging the converter or other system components, and less than optimum output.

Ideally, horns are made of materials that have a high strength-to-weight ratio and low losses at ultrasonic frequencies. Titanium has the best acoustical properties of the high-strength alloys. Titanium horns may be carbide-faced to provide wear resistance for higher amplitude applications. Heat-treated steel alloy horns have a wear-resistant surface, but higher ultrasonic losses limit the use of these horns to low amplitude applications such as insertion. Aluminum horns also are used.

Horn displacement amplitude refers to the peak-to-peak excursion of the horn face. A horn having a 0.0127 cm (0.005 in) displacement amplitude moves over a peak-to-peak distance of 0.0127 cm (0.005 in). Horn velocity is the rate of motion of the horn face. If a horn in the form of a rod is driven at its natural (or resonant) frequency, the ends will expand and contract longitudinally about its center alternately lengthening and shortening the rod, but no longitudinal motion will occur at the center or nodal plane. The ultrasonic stress at the node, however, is greatest and reduces to zero at the two ends.

If the output section of the rod is reduced so its cross-sectional area is less than that of the input area, the amplitude will increase. For example, if there is a cross-sectional area ratio of 2:1 between the input and output sections of a horn, a 0.0127 cm (0.005 in) input will be amplified two times resulting in a 0.025 cm (0.010 in) output.

Different horn designs illustrate how different cross-sectional areas produce amplitude transformation. The step horn, consisting of two sections each having different but uniform cross-sectional areas, has the highest gain for a given input to output area ratio. While the gain of a step horn is highest, the stress in the nodal region (which includes the nodal plane) is also highest compared to other designs when the horns are used at comparable output amplitudes. In the step horn, stress is a maximum at the radius between the two sections, and material fracture is most likely to occur in this area if the horn is driven at an excessive amplitude. The very high gain factor (up to 9:1) of these horns and the unfavorable stress characteristics limit the application of the step horn design.

Exponential horns have a very desirable stress-to-amplitude correlation, but a very low gain. The gradual taper of this design (following an exponential curve) distributes internal stress over a large area resulting in low stress at the nodal area. Exponential horns are used primarily for applications that require high force and low amplitude, such as metal insertion.

The catenoidal horn, whose shape follows a catenoidal curve, combines the best characteristics of the step horn and the exponential horn. Fairly high amplitudes are achieved at a moderate stress. Both exponential and catenoidal designs are available with the output end tapped, permitting many different tip configurations to be attached to these horns.

Bar or rectangular horns have many configurations and range in face length from 0.3 cm (0.125 in) to 2.54 cm (1 in) or longer. Rectangular horns may be stepped or tapered, and horns less than 9 cm (3.5 in) are sometimes solid through the body. Longer horns have slots that cross the nodal plane to reduce lateral stress by breaking up critical dimensions that produce unwanted lateral motion or other modes of vibration. The result of slotting is a network of individual members, all oscillating in a longitudinal mode with side motion reduced and with unwanted modes of vibration suppressed. Slotted bar horns have been made up to 60 cm (24 in) long.

Circular horns can be made hollow or solid and have been made in sizes up to 30.5 cm (12 in) in diameter. Circular horns larger than 9 cm (3.5 in) in diameter also require slotting to reduce radial or cross-coupled stresses.

Generally the horn frequency is independent of the cross-sectional area. This means that two horns of different cross-sectional area made out of same material have approximately the same wavelength. In wide rectangular axial horns having slots, the slots are made parallel to the direction of vibration. In a block rectangular horn the slots are made in two orthogonal directions parallel to the direction of motion. In horns with a circular cross section, diagonal slots are made. The slots begin close to the input end of the horn, cross the nodal plane, and end close to the output end of the horn, as described in U.S. Pat. No. 4,315,181. The purpose of the vertical slots is to achieve controlled or uniform amplitude at the output end face. The number and the dimension of the slots determine the amplitude uniformity on the weld face. However the length of the horn is not changed because of the slots; the half wavelength is still approximately 12.7 cm (5 in).

SUMMARY OF THE INVENTION

An acoustic horn imparts energy at a selected wavelength, frequency, and amplitude. The horn has at least one nodal plane and a natural frequency of vibration. The horn has an outer surface and at least one cutout located in the outer surface. The cutout is located at a longitudinal location on the surface that does not contact the nodal plane. The horn length is a function of the shape, size, number, and location of the cutouts, and is less than the length of a solid horn having the same natural frequency of vibration.

The cutouts can include at least one of a slot, a hole and a groove.

The horn can be hollow and can have an inner surface. The cutouts can be through cutouts that extend from the inner surface to the outer surface. This horn can have a groove in the inner surface and a plurality of through openings extending from the groove.

The horn can vibrate at a natural frequency and the length of the horn can be less than one-half wavelength of vibration.

The cutouts can be placed along the vibrational axis of the horn, can be perpendicular or at an angle to the axis of vibration, and can be distributed uniformly or randomly.

DETAILED DESCRIPTION

The present invention is an axial vibrating horn having cutouts which permit changing the length of the horn. The cross-sectional area of the horn can be circular, rectangular, or any other geometric or other shape. The cutouts can be made by removing material from the horn, by forming them with the horn, or in any other known manner. These cut-outs are distributed along the length of the horn and can be of any geometric shape such as rectangular or other-shaped slots; circular, elliptical, or other-shaped holes; grooves; and any combination of the above. The total length of the horn can vary depending on the number and location of the cutouts, and the shape and size of the cutouts. The cutouts can be placed along the vibrational axis of the horn. Each cutout is either perpendicular to or at an angle with the horn's axis of vibration. The cutouts can be distributed uniformly or randomly.

Figure 1:
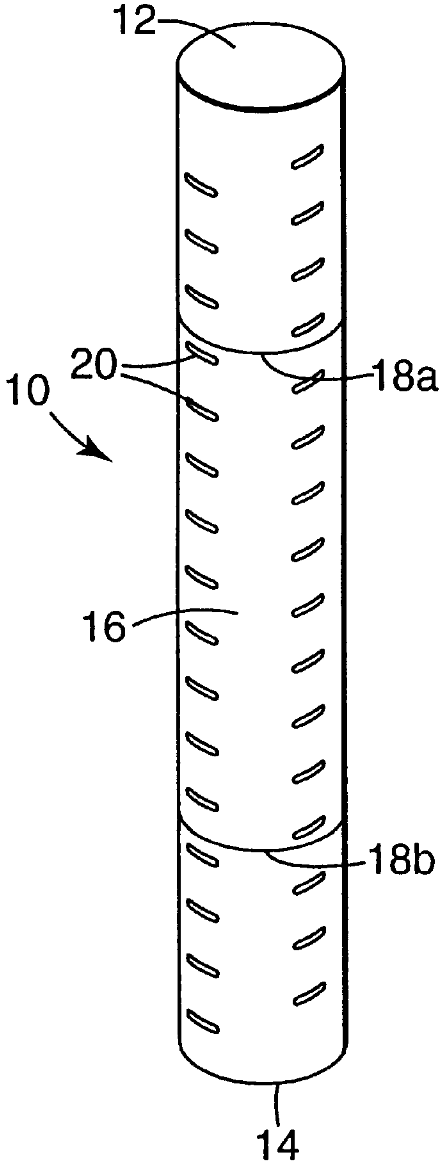
FIG. 1 is a perspective view of a horn according to one embodiment of the present invention.

FIG. 1 is a perspective view of a horn. The horn 10 has an input end 12, an output end 14 and an outer surface 16. The horn 10 is shown as a solid, cylindrical, full wavelength horn and has two nodal planes 18*a* and 18*b* one fourth of the distance from the input and output ends, respectively. A series of cutouts, shown as straight slots 20 are formed in the outer surface 16. As shown, none of the slots 20 crosses the nodal planes 18*a* and 18*b*. Alternatively, the horn can be a half-wavelength horn with a single nodal plane half way between the input and output ends.

The primary purpose of the cutouts is to permit changing, specifically shortening, the length of the horn. The cutouts also permit passing gas, liquid, powder, or solid material in process applications.

Consider a characteristic (segmented) length l of a horn having a cross-sectional area A. The fundamental natural frequency for the axial vibration for this length is shown in Equation 1.

$$f = l^{-1}\sqrt{\frac{E}{\rho}} \tag{1}$$

A cutout, such as a slot, in this characteristic length l of the horn can have a height h and a cross-sectional area of the slot $A_{slot}$. $R_a$ is the ratio of the cross-sectional area at the slot section to the area of the solid section.

$$R_a = A_{slot}/A$$

$R_1$ is the ratio of the slot height h to the characteristic length l.

$$R_1 = h/l$$

By assuming a spring mass system and eliminating the insignificant higher order terms, an approximate relationship between natural frequency of the solid and slotted sections can be established as follows.

$$f_{slot} = f_{solid}\sqrt{\frac{R_a}{(R_a + R_l)}} \tag{2}$$

This means that for any slotted section, the natural frequency is less than the natural frequency of the solid section. Consider the characteristic length as the length of the periodicity of the slots. If the characteristic length is repeated to make a horn, the relationship between the total length of a slotted horn ($L_{slot}$) and the length of a solid horn ($L_{solid}$) having the same 20 kHz frequency is:

$$L_{slot} = L_{solid}\sqrt{\frac{R_a}{(R_a + R_l)}} \tag{3}$$

This means that if the slots are distributed along the length of the horn, the total length of a slotted horn is less than that of a solid horn having the same frequency. If the slots are closer to each other, $R_1$ is higher and $L_{slot}$ is lower compared to the solid horn.

Figure 2:
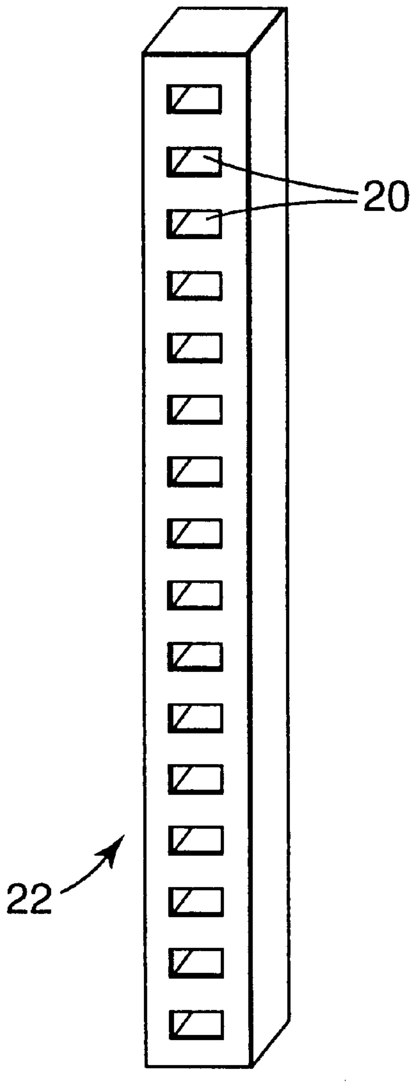
FIG. 2 is a perspective view of a horn according to another embodiment of the present invention.

In one example, a square horn 22, shown in FIG. 2, has a cross-sectional area of 2.54 cm by 2.54 cm or 6.45 cm$^2$ (1 in$^2$) . The slots 20 are 1.27 cm (0.5 in) wide and 0.51 cm (0.2 in) high. The slots 20 are distributed 1.27 cm (0.5 in) apart, and the characteristic length l is equal to 1.27 cm (0.5 in). The area of the solid section A is 6.45 cm$^2$ (1 in$^2$) and the area of the horn at the slotted section $A_{slot}$ is 1.61 cm$^2$ (0.5 in$^2$). The values of $R_a$ and $R_1$ are 0.5 and 0.4, respectively. Using equation 3, the length of this slotted horn is 74.5% of the length of a similarly formed solid horn. For a full wavelength horn, if the solid horn is 25.4 cm (10 in) long then the slotted horn need only be 18.9 cm (7.45 in) long.

Figure 3:
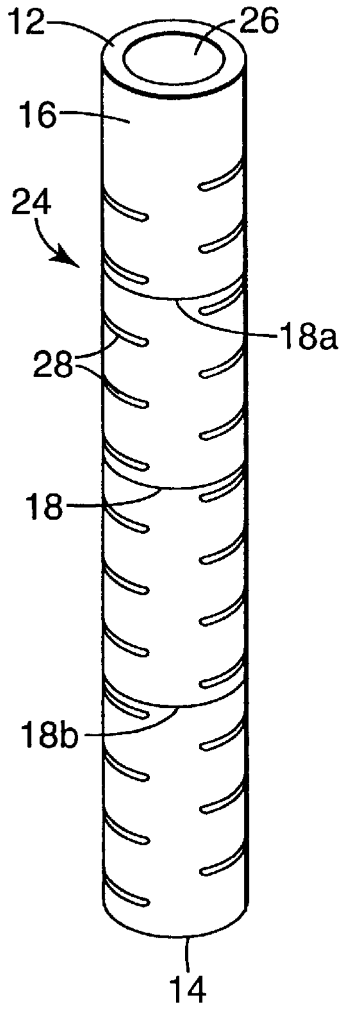
FIG. 3 is a perspective view of a horn according to another embodiment of the present invention.
Figure 4:
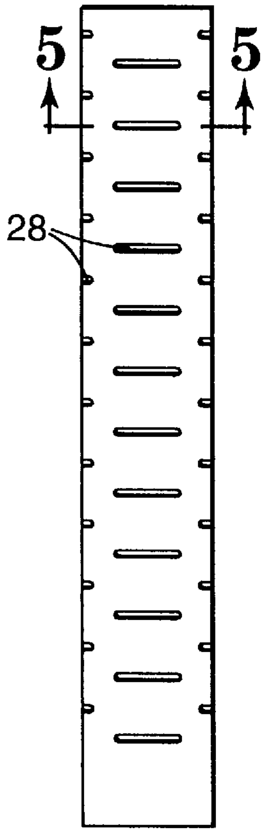
FIG. 4 is a side view of the horn of FIG. 3.
Figure 5:
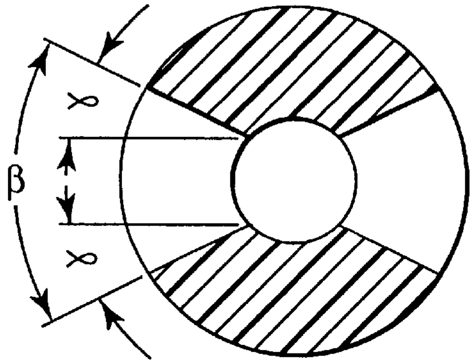
FIG. 5 is another cross-sectional view of the horn of FIG. 3.

In another example, a hollow circular horn 24, shown in FIGS. 3–5, has an outer diameter of 2.54 cm (1 in), and an inner diameter of 0.76 cm (0.3 in). This horn has an inner surface 26 concentric with the outer surface 16. (Other versions of this hollow horn can have non-circular and non-concentric inner surfaces.) This horn 24 has angled slots 28. The slot height is approximately 0.15 cm (0.06 in) and the slots are spaced 0.599 cm (0.236 in) apart. The slots 28 are made at an angle β of 52°. (Each sidewall of the slot is located an angle α of 26° away from parallel to the other sidewall such that the slot increases in width from the inner wall to the outer wall of the hollow cylinder, as shown in FIG. 5.) The values of $R_a$ and $R_1$ are 0.29 and 0.254, respectively. Using Equation 3, the length of the slotted horn is 73% of the length of a solid horn without slots. If the length of the solid horn is 24.4 cm (9.6 in), then the slotted horn is 17.8 cm (7.0 in). Finite element method, a numerical computer modeling technique, determines the horn length to be 16.1 cm (6.35 in). The actual horn made tuned at 20 kHz for a length of 15.6 cm (6.15 in).

The following table shows the full wavelength of the above horn for different slot angles.

| Slot Angle (°) | 90 | 52 | 0 | No slots |
|---|---|---|---|---|
| Full wavelength (cm) | 11.1 | 16.15 | 22.1 | 24.4 |

As more material is removed from the slot, the horn can be shorter. Also, the corners of the slots can be rounded off with holes to minimize the stress concentration and to increase the life of the horn.

Figure 6:
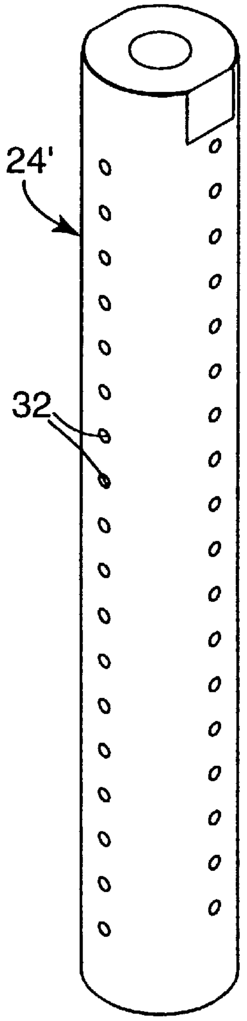
FIG. 6 is a perspective view of a horn according to another embodiment of the present invention.

In a modification of this hollow cylindrical horn 24', holes 32 can be made perpendicular to the axis of vibration and distributed along the length of the horn, as shown in FIG. 6. The diameter of the holes and their spacing determine the length and the gain in the horn. Finite element method is used to determine the full wavelength of a hollow horn of outer diameter of 2.29 cm (0.9 in) and inner diameter of 0.76 cm (0.3 in) for different hole diameter. The holes are placed at a distance of 0.60 cm (0.236 in). The following chart shows some results.

| Hole Diameter (cm) | 0.2 | 0.38 | 0.54 |
|---|---|---|---|
| Full wavelength (cm) | 24.84 | 23.70 | 22.40 |

Because not much material is removed compared to slotted horns, the length did not change significantly.

Figure 7:
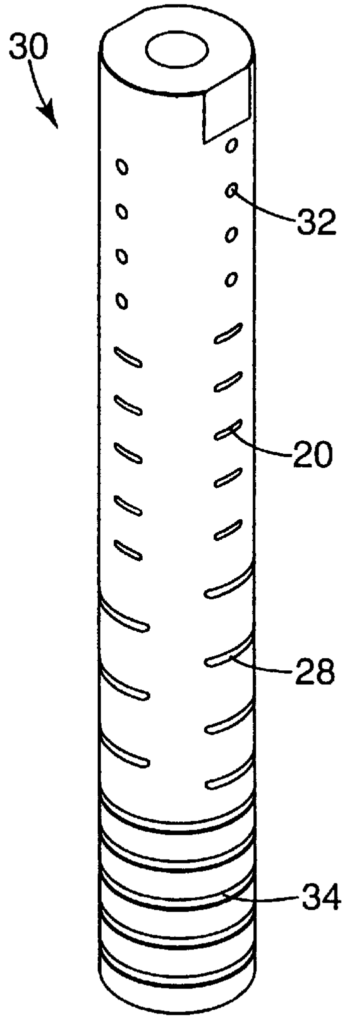
FIG. 7 is a perspective view of a horn according to another embodiment of the present invention.

FIG. 7 shows a horn 30 having several different types of cutouts. Slots 20, 28, holes 32, and grooves 34 are formed in the outer surface 16. Horizontal grooves 34 can be distributed along the length of the horn. As in cases of the slots 20, 28 and holes 32, the dimension of the grooves 34 also determines the horn length.

Figure 8:
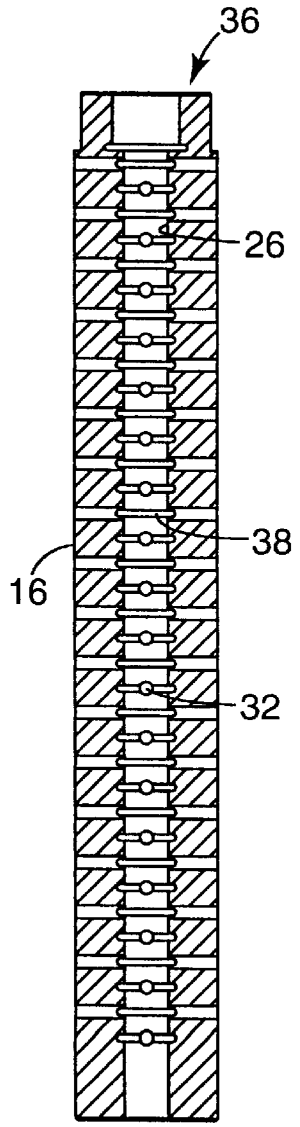
FIG. 8 is a cross-sectional view of a horn according to another embodiment of the present invention.

In another embodiment shown in FIG. 8, a hollow horn 36 can have circumferential grooves 38 formed along the inner surface 26 of the horn extending completely around the inner surface. One or more through holes, slots or other cutouts (holes 32 are shown) can extend through the horn, from each groove 38 to the outer surface 16 of the horn 36. In another embodiment, grooves 34 can also be provided on the outer surface of the horn.

In all of these embodiments, cutouts can be distributed uniformly or nonuniformly and can be arranged in a row or distributed randomly. To summarize, the cutouts in the known horns are used to obtain a controlled displacement, minimize side motion, and to suppress unwanted modes of vibration. The present invention has cutouts which are distributed along the length of the horn to change the total length characteristics. (The known horns do not achieve this.) Various changes and modifications can be made in the invention without departing from the scope or spirit of the invention.

We claim:

1. An acoustic horn for vibrating longitudinally and imparting energy at a selected wavelength, frequency, and amplitude, wherein the horn has at least one nodal plane and a natural frequency of vibration and comprises:

an outer surface; and at least one cutout located in the outer surface at a longitudinal location on the surface that does not contact the nodal plane, wherein the horn length is a function of the shape, size, number, and location of the cutouts, and the cutout enables the horn length to be less than the length of a solid horn having the same natural frequency of vibration.

2. The acoustic horn of claim 1 wherein the cutout comprises at least one of a slot, a hole and a groove.

3. The acoustic horn of claim 1 wherein the horn is hollow and further comprises an inner surface, and wherein the cutouts are through cutouts that extend from the inner surface to the outer surface.

4. The acoustic horn of claim 3 further comprising a groove in the inner surface and a plurality of through openings extending from the groove.

5. The acoustic horn of claim 1 wherein the horn vibrates at a natural frequency and the length of the horn is less than one-half wavelength of vibration.

6. The acoustic horn of claim 1 wherein the cutouts are placed along the vibrational axis of the horn.

7. The acoustic horn of claim 1 wherein each cutout is one of perpendicular and at an angle to the axis of vibration.

8. The acoustic horn of claim 1 wherein the cutouts are distributed one of uniformly and randomly.

9. The acoustic horn of claim 1 which is formed as a one-piece horn.

* * * * *